United States Patent [19]

Brewer

[11] 4,292,851

[45] Oct. 6, 1981

[54] COPPER GRID FOR STRAIN ANALYSIS OF SHEET METAL DEFORMATION

[75] Inventor: Earl G. Brewer, Warren, Mich.

[73] Assignee: General Motors Corporation, Detroit, Mich.

[21] Appl. No.: 137,316

[22] Filed: Apr. 4, 1980

[51] Int. Cl.³ .............................................. G01B 5/30
[52] U.S. Cl. ...................................................... 73/762
[58] Field of Search .................. 73/762; 116/DIG. 34

[56] References Cited

U.S. PATENT DOCUMENTS 3,789,657  2/1974  Ching et al. .......................... 73/762

OTHER PUBLICATIONS

Ayres et al., "Grid Circle Analyzer–Computer Aided Measurement of Deformation,", SAE Technical Paper, No. 790741, Jun. 11, 1979.

*Primary Examiner*—Anthony V. Ciarlante
*Attorney, Agent, or Firm*—Douglas D. Fekete

[57] ABSTRACT

An improved grid for computer-aided strain analysis of a deformed metal sheet comprises a preferred grid pattern of noncontacting uniform solid circles formed of thin plated copper and surrounded by exposed sheet surface. The copper circles are applied to the sheet surface and the sheet is deformed, whereupon the circles are stretched into ellipses. After sheet deformation, the ellipse pattern is oxidized to enhance contrast between the copper ellipses and the surrounding sheet metal and thereby enable the pattern to be reliably photographed for computer analysis.

3 Claims, 2 Drawing Figures

COPPER GRID FOR STRAIN ANALYSIS OF SHEET METAL DEFORMATION

BACKGROUND OF THE INVENTION

This invention relates to a method for analyzing metal strain caused by deformation of sheet metal, which analysis comprises measuring distortion in a grid applied to the sheet surface prior to deformation. More particularly, this invention relates to decorating a metal sheet surface with a grid featuring uniform solid circles that are stretched into ellipses during sheet deformation and thereafter readily measured to calculate strain in the underlying metal.

Sheet metal components are fabricated by stamping a flat sheet between suitable dies. Improved die design is possible by understanding the metal strain produced by stamping at various locations of the sheet. A preferred method for analyzing the strain involves printing on the flat sheet a grid pattern of uniform small circles of predetermined diameter. During metal forming, the circles are stretched into ellipses. By determining the change in dimensions for each ellipse, the strain of the underlying metal may be calculated. Accurate human measurement of each ellipse is tedious and timeconsuming, typically requiring up to two minutes per point. However, coassigned U.S. patent application Ser. No. 098,260, filed Nov. 28, 1979, and entitled "Method and Apparatus for Automatically Determining Sheet Metal Strength", teaches a method for determining the ellipse dimensions and calculating the strain that is adapted to be carried out by a computer in a fraction of the time. The method comprises photographing the elliptical pattern on the sheet metal surface with a solid-state instrumentation camera. The computer divides the picture into light and dark regions, determines the boundary points between the regions and fits the boundary points to an ellipse. The strain is then computed from the major and minor axes of the ellipse.

One method of printing the circle grid comprises electro-etching. The desired pattern is defined with an electrolyte-soaked silkscreen and is etched in the metal by suitably passing a current through the screen between the sheet and a roller counterelectrode. Grids produced by electro-etching have intolerable variations in the circle diameters and poor circle (and thus ellipse) edge definition. This reduces the accuracy of the strain measurements. In addition, etching sufficient to produce a visible pattern may affect the sheet metal formability. Another grid-printing method comprises coating the sheet with a polymeric photoresist and exposing to ultraviolet light through a suitable mask to define the circles. The usually clear polymer must be dyed to make the pattern visible, particularly for photographing. Although photoprinting improves circle uniformity, the circles are frequently abraded or wrinkled during stamping because the polymer-metal adhesion is not sufficient to withstand the wiping die action. In addition, the polymer tends to deteriorate, particularly where high temperatures are encountered during stamping.

Therefore, it is an object of this invention to provide a method for decorating a surface of a metal sheet with a sharply defined, dimensionally accurate grid of a pattern suitable for strain analysis in the deformed metal, preferably an array composed of uniformly spaced solid circles of predetermined diameter. The grid does not significantly affect the metal sheet formability, and tightly adheres to the surface without deteriorating during deformation to thereby form a distorted pattern on the formed sheet, preferably of ellipses. After deformation, the distorted grid develops a high-contrast pattern having accurately locatable boundaries that is readily photographable and adapted for computer strain analysis.

SUMMARY OF THE INVENTION

In accordance with the preferred embodiment, an improved method for computer-aided strain analysis comprises applying to a metal sheet surface a grid of uniformly sized, noncontacting solid circles formed of a thin film of metallic copper, which circles are surrounded by exposed sheet surface. The circles are formed by first electroplating a tightly adherent copper film onto the entire area where the grid is desired. A suitable photoresist material is applied to the copper film and developed to positively define the circles, that is, so that the photoresist mask covers the copper circles. The exposed copper about the masked circles is chemically stripped without etching the sheet metal and the protective photoresist is cleaned away to produce the desired copper circle pattern. The gridded metal sheet is formed into the desired shape, such as by stamping between dies. As the underlying metal is deformed, the circles are stretched into ellipses. The formed sheet is heated in air to oxidize at least the copper and thereby enhance the contrast between the ellipses and the surrounding sheet surface. The resulting high-contrast ellipse pattern features accurately definable boundaries and is readily photographable for computer-aided strain analysis.

Thus, this invention provides a grid comprising thin electroplated copper regions. The metallic copper has good ductility which helps to minimize the effect of the thin film upon the sheet deformation. In addition, the copper tightly adheres to the sheet surface so that the grid is distorted in conjunction with the deformation of the underlying metal, even when the sheet is formed under severe conditions, including high temperatures. After the forming operation, oxidation of the copper produces a high-contrast ellipse pattern having well-defined edges. This pattern is readily photographed to form an image that is suitably divided by a computer into dark and light regions, corresponding to the ellipses and exposed sheet. The boundary between regions is accurately locatable by the computer and fitted to an ellipse equation to compute the major and minor ellipse axes, and thus the strain.

DETAILED DESCRIPTION OF THE INVENTION

Figure 1:
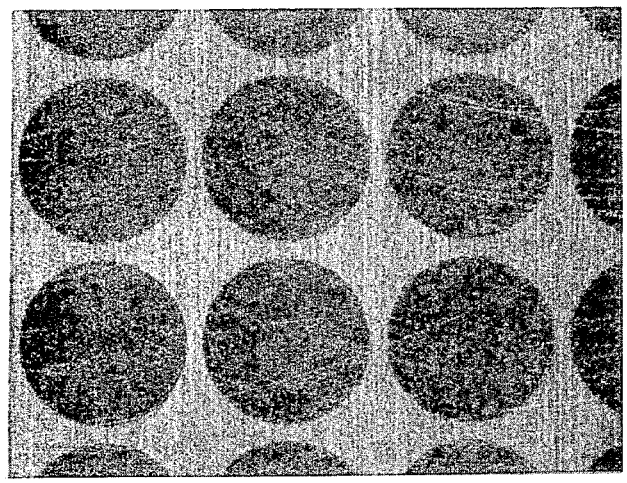
FIG. 1 is a photograph of the preferred grid comprising copper-plated circles on an aluminum sheet surface.

In the preferred embodiment, a 20.3 cm square aluminum panel was printed with an array of copper circles, deformed and analyzed for strain. The panel was 0.8 mm (0.030 in.) thick and composed of 2036-T4 aluminum, a fully annealed alloy containing 3% copper. This alloy is typically employed to fabricate sheet components, such as in the automotive industry.

The panel was cleaned with 1,1,1 trichloroethane. The entire panel surface was electroplated with copper by immersing the panel in an acidic copper sulfate solution and passing an electrical current for a time sufficient to plate a 0.01 mm thick copper film. The plating solution contained 97 grams per liter (g/l) copper sulfate pentahydrate ($CuSO_4.5H_2O$) and 201 g/l concentrated sulfuric acid ($H_2SO_4$) in water and had a chloride ion concentration of between 20 to 80 ppm. The applied DC potential was 4.5 volts and the cathode (panel) current density was 377 amperes per square meter.

The copper film was coated with a UV-sensitive polymeric photoresist, commercially available from the Eastman Kodak Company under the trade designation KPR ®. This material is a positive photoresist, that is, it is polymerized by exposure to ultraviolet light. The photoresist was applied by flowing onto the panel and oven baked at 43° C. for about 30 minutes. It was masked with a stencil comprising an array of transparent dots in a black matrix and selectively developed by ultraviolet light exposure for about 30 seconds. Thereafter, the unexposed polymer was removed with xylene solvent, thereby exposing the underlying copper film.

The exposed copper was stripped away by immersion in a chromic acid solution containing 60 g/l chromium trioxide ($CrO_3$) and 1.8 g/l sulfuric acid. Chromic acid chemically removed copper, but did not etch the underlying aluminum metal. The aluminum surface may be slightly oxidized by the chromic acid bath, but this is not believed detrimental since aluminum stock typically has an oxide coating. After rinsing, the UV-exposed photoresist that had protected the copper circles during stripping was removed with lacquer thinner.

FIG. 1 shows a portion of the resulting gridded surface. The surface was decorated with a uniform array of noncontacting solid copper circles of 0.25 cm (0.1 inch) diameter and having sharp boundaries. The circle diameters have been maintained within close tolerances, primarily as a result of utilizing the photoresist technique to define the array. To the eye, the circles appeared golden against the silver-to-white background. When photographed in black and white, the two regions are visiable as shades of grey of varying darkness.

The panel was deformed in a punch press using a 100 mm diameter spherical punch of the type used for Limiting Dome Height tests. During deformation, the tightly adherent copper circles were stretched into ellipses, but otherwise maintained their integrity. The copper grid had no observable effect upon panel deformation.

After deformation, the copper ellipses were clearly visible to the eye as a golden pattern against a whitish background, similar to the circle grid. Although suitable for measurement by an operator, the photographed image was not reliable for computer analysis. The computer attempts to locate the ellipses based upon light intensity, regardless of color or texture, and the copper and aluminum grey shades were too subtle for this distinction to be dependable. Another factor contributing to the poor photographability was occasional glare from light shining onto the highly reflective copper film.

In accordance with this invention, a high-contrast ellipse pattern was developed by oxidizing the surface for 15 minutes at about 300° C. in a circulating air furnace. This treatment turned the ellipses very dark brown or black, characteristic of copper oxide (CuO) film. Although this short treatment may have increased the aluminum surface oxidation, no visible change was observed. It is noted that aluminum oxide is characteristically white, so that prolonged treatment may whiten the sheet surface and enhance the contrast with the ellipses.

Figure 2:
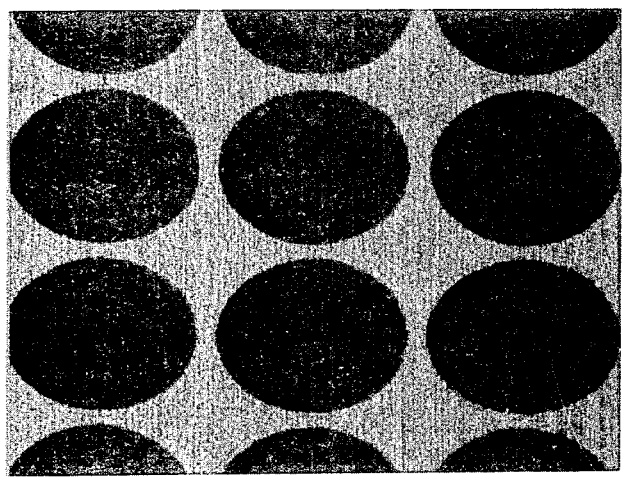
FIG. 2 is a photograph of the grid-decorated aluminum surface after sheet deformation and oxidation to develop the copper ellipses. Both photographs were taken with a Polaroid ® camera that enlarged the image tenfold.

The resulting ellipse pattern is seen, in black and white, in FIG. 2. The high contrast between the black ellipses and the surrounding light grey is clearly visible and enables the border therebetween to be accurately and unambiguously located. In addition, the black copper oxide film decreases glare from lights during photographing. As also seen in FIG. 2, the copper film tightly adhered to the underlying aluminum during deformation and therefore stretched when the underlying metal was bent. Thus, the ellipses are suitable for calculating the strain of the underlying metal.

The strain was calculated with the aid of a computer. The section of the array comprising at least one complete ellipse was photographed using a General Electric TM-220 camera containing a 128×128 matrix of light-sensing elements of the charge injection type. A 50 mm lens with a 60 mm extension tube was employed to focus a viewing area showing one ellipse. The lighting source was a fluorescent ring placed about the lens. The camera integration was about 1/30th of a second to prevent fluorescent flicker from interfering with photographing.

After photographing, the signal from each sensing element was assigned a value depending upon the light intensity. As detailed in the aforementioned U.S. patent application Ser. No. 098,260; the computer analyzed these light intensity values and divided the photograph into light and dark regions. These results are made more reliable by the high-contrast image provided by the oxidized ellipse of this invention. The computer thereafter determined boundary points between the two regions and best fitted this data to an elliptical equation. The results were compared with the actual boundary points, which were more accurately located as a result of the high-contrast image.

The major and minor ellipse axes were determined from the computed elliptical equation. The major axis of the ellipse in FIG. 2 is 2.95 mm, 0.45 mm greater than the original circle diameter. Thus, the strain of the underlying metal was 18%. Similarly, the minor axis was 2.33 mm and the minor strain was −7%. The true ellipse shape indicates that the underlying metal was uniformly strained well below the failure value. Patterns comprising egg-shaped or distorted ellipses are characteristic of incipient failure.

Although in the preferred embodiment, the copper grid was utilized to analyze strain of an aluminum sheet, it is apparent that the grid may be suitably employed to analyze strain of other metals. For example, the copper circle array has been applied to a steel sheet surface. However, treating the deformed steel at 300° C. in air for 20 minutes, heat-tinted the steel surface, turning it dark purple. The resulting image with the brown copper oxide circles is high-contrast and suitable for computer analysis, but appears in black and white as light dots on a dark background. This image is conveniently interfaced with the computer in the preferred embodiment, which is programmed to analyze dark ellipses, by switching the polarity of the camera to feed the negative of the actual image. Alternately, the copper film may be applied to define the region about the circles, using the exposed steel to form the circles.

In the preferred embodiment, the copper film was applied by electroplating and a photoresist was utilized to define the desired grid. Electroless copper plating also provides a suitable film and may be preferred for applying a grid to a portion of a large panel. Other methods are also available for defining the copper circles. For example, a suitable grid of the circles is directly plated through a silkscreen without additional circle-defining steps, although silkscreening does not provide as sharp a boundary as photoresist techniques.

A grid of solid circles is preferred for computer analysis because the resulting ellipses may be readily distinguishable based upon relatively large regions of differing light intensity. The method of this invention may be adapted for applying other suitable grid patterns for measuring strain. Suitable patterns may include designs formed of lines, rather than solid geometric shapes. For example, elliptical distortion may be analyzed in an array of uniform linear circles or concentric circles of varying diameter. A grid of a series of right intersecting straight lines, such as found commonly on graph paper, may be useful particularly for showing areas of nonuniform strain across a sheet by examining the curvature of the lines on the deformed sheet. In some cases, acceptable strain analysis may be simply carried out utilizing a grid of uniformly spaced dots and measuring the distortion in the spacing of the dots after deformation. The high-contrast pattern provided by this invention may be particularly advantageous for these grids comprising lines or dots, since it may enable the narrow or small features to be more readily identified by the computer.

Although this invention has been described in terms of certain embodiments thereof, it is not intended that it be limited to the above description but rather only to the extent set forth in the claims that follow.

The embodiments of the invention in which an exclusive property or privilege is claimed are defined as follows:

1. In the method of analyzing the deformation of a metal sheet comprising decorating at least a portion of the sheet surface prior to deformation with a predetermined grid pattern, deforming the sheet, and measuring the resulting distortion in the grid, said measurement being performed with the aid of a computer that identifies the distorted pattern based upon variations in light intensity, the improvement comprising forming a grid comprising bordering regions of thin metallic copper film and exposed sheet surface, said copper film having a minimal effect upon the metal sheet deformation, and oxidizing the copper film after the sheet deformation to enhance the contrast between the bordering copper and sheet regions and to thereby produce a pattern that is more readily identifiable by a computer.

2. In the method of analyzing the deformation of a noncupreous base metal sheet comprising decorating at least a portion of the sheet surface prior to deformation with a grid pattern of noncontacting uniform solid circles, deforming the sheet, and measuring the resulting distortion in the circles, said measurement being carried out by photographing the distorted circles and analyzing the photograph with the aid of a computer, the improvement comprising forming the grid circles of a thin metallic copper film arrayed within a matrix of sheet surface, said copper film having a minimal effect upon the metal sheet deformation, and oxidizing the copper film after the sheet deformation to develop high contrast between the distorted circles and the adjacent sheet surface that is reliably photographable.

3. In the method of analyzing the deformation of a noncupreous base metal sheet comprising decorating at least a portion of the sheet surface prior to deformation with a grid pattern of noncontacting uniform solid circles in a matrix, deforming the sheet, and measuring distortion in the circles, said measurement being carried out by photographing the distorted grid and analyzing the photograph with the aid of a computer, the improvement comprising plating a thin film of metallic copper onto the portion of the sheet surface, defining the pattern with a photoresist mask that overlies the copper film where circles are desired and exposes the copper film where the matrix is desired, stripping the exposed copper to expose without etching the sheet surface thereunder while protecting the remaining copper with the photoresist mask, removing the photoresist mask, whereupon the desired grid pattern is produced comprising circles formed of thin copper film and exposed sheet surface, deforming the sheet, whereupon the copper circles are distorted, and heating the deformed sheet in air to at least oxidize the copper to enhance the contrast between the distorted circles and the matrix and thereby produce a grid that is reliably photographable for computer analysis.

* * * * *